US012777010B2

(12) United States Patent
Darmour et al.

(10) Patent No.: US 12,777,010 B2
(45) Date of Patent: Oct. 27, 2026

(54) CONTENT-BASED ROUTING OF MESSAGE COMPONENTS

(71) Applicant: Oracle International Corporation, Redwood Shores, CA (US)

(72) Inventors: Jennifer Darmour, Seattle, WA (US); Orry Soegiono, Bellevue, WA (US); Micah Lawler Sonderman, San Antonio, TX (US); Hillel Noah Cooperman, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/939,022

(22) Filed: Nov. 6, 2024

(65) Prior Publication Data

US 2026/0075023 A1 Mar. 12, 2026

Related U.S. Application Data

(60) Provisional application No. 63/691,487, filed on Sep. 6, 2024.

(51) Int. Cl.

| | |
|---|---|
| ***H04L 51/214*** | (2022.01) |
| ***G06F 40/30*** | (2020.01) |
| ***H04L 51/04*** | (2022.01) |

(52) U.S. Cl.

CPC ............ *H04L 51/214* (2022.05); *G06F 40/30* (2020.01); *H04L 51/04* (2013.01)

(58) Field of Classification Search

None

See application file for complete search history.

(56) References Cited

U.S. PATENT DOCUMENTS

| | | | | |
|---|---|---|---|---|
| 10,592,695 | B1 * | 3/2020 | Ledet | H04L 9/3226 |
| 11,302,448 | B1 | 4/2022 | Jain et al. | |
| 2007/0130368 | A1 | 6/2007 | Martin et al. | |
| 2010/0017194 | A1 | 1/2010 | Hammer et al. | |
| 2016/0028827 | A1 | 1/2016 | Ahmed et al. | |
| 2019/0014213 | A1 | 1/2019 | Kumar et al. | |
| 2021/0234816 | A1 | 7/2021 | Zong et al. | |
| 2021/0256534 | A1 * | 8/2021 | An | G06F 16/285 |
| 2022/0311728 | A1 * | 9/2022 | Sivaswamy | G06N 3/084 |
| 2022/0405311 | A1 * | 12/2022 | Malin | G06Q 30/0201 |

(Continued)

OTHER PUBLICATIONS

"Healthcare Messaging: How Dynamic Intelligent Routing Works", Retrieved from https://www.perfectserve.com/blog/healthcare-messaging-dynamic-intelligent-routing/, Retrieved on Nov. 8, 2024, pp. 1-10.

(Continued)

*Primary Examiner* — Scott B Christensen

(74) *Attorney, Agent, or Firm* — Invoke

(57) ABSTRACT

Techniques for routing a message based on the content of the message include detecting a message and computing a plurality of message components comprised in the message. The system processes the respective message components to determine respective sets of message attributes for the respective message components. The system applies a machine learning model to a set of message attributes to select a recipient for the associated message component and transmits the message component to the selected recipient.

15 Claims, 8 Drawing Sheets

(56) References Cited

U.S. PATENT DOCUMENTS

| | | | | |
|---|---|---|---|---|
| 2023/0179687 | A1* | 6/2023 | Guidotti | H04L 51/214 709/206 |
| 2023/0392954 | A1* | 12/2023 | Rao | G08G 5/21 |
| 2024/0177827 | A1 | 5/2024 | Kunz et al. | |

OTHER PUBLICATIONS

"Patient Flow Management System", Retrieved from https://www.qnomyhealth.com/patient-flow-management, Retrieved on Nov. 8, 2024, pp. 1-5.

"What is Intelligent Routing?", Boostlingo, Retrieved from https://boostlingo.com/what-is-intelligent-routing/, Retrieved on Nov. 8, 2024, pp. 1-7.

"Defining Intelligent Routing and Its Impact in Healthcare", Boostlingo, Retrieved from https://boostlingo.com/what-is-intelligent-routing/, Retrieved on Nov. 8, 2024, pp. 1-7.

* cited by examiner

CONTENT-BASED ROUTING OF MESSAGE COMPONENTS

BENEFIT CLAIMS; RELATED APPLICATIONS; INCORPORATION BY REFERENCE

This application claims the benefit of U.S. Provisional Patent Application 63/691,487, filed Sep. 6, 2024, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to content-based routing of messages received by an application. In particular, the present disclosure relates to identifying components of a message, selecting recipients for the different components, and transmitting a message component to a recipient.

BACKGROUND

Organizations allow external entities to communicate with employees and automated agents of the organization through various messaging interfaces. For example, patients may communicate with the staff of a medical practice via a patient portal. Clients of a legal practice or other business may communicate with the business staff via messaging provided by a website chat agent or other "contact us" messaging modalities. Messages received from external entities may include multiple issues that need attention. The sender may not know to whom to address a message, or the sender may address or direct a message to an individual who may not be able to act on the issue(s) in the message. These issues may cause delays in responding to the issues in the message as the staff routes or re-routes the message to the appropriate individuals in the organization.

The approaches described in this section are approaches that could be pursued, but not necessarily approaches that have been previously conceived or pursued. Therefore, unless otherwise indicated, one should not assume that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. One should note that references to "an" or "one" embodiment in this disclosure are not necessarily to the same embodiment, and they mean at least one. In the drawings.

DETAILED DESCRIPTION

Figure 1:
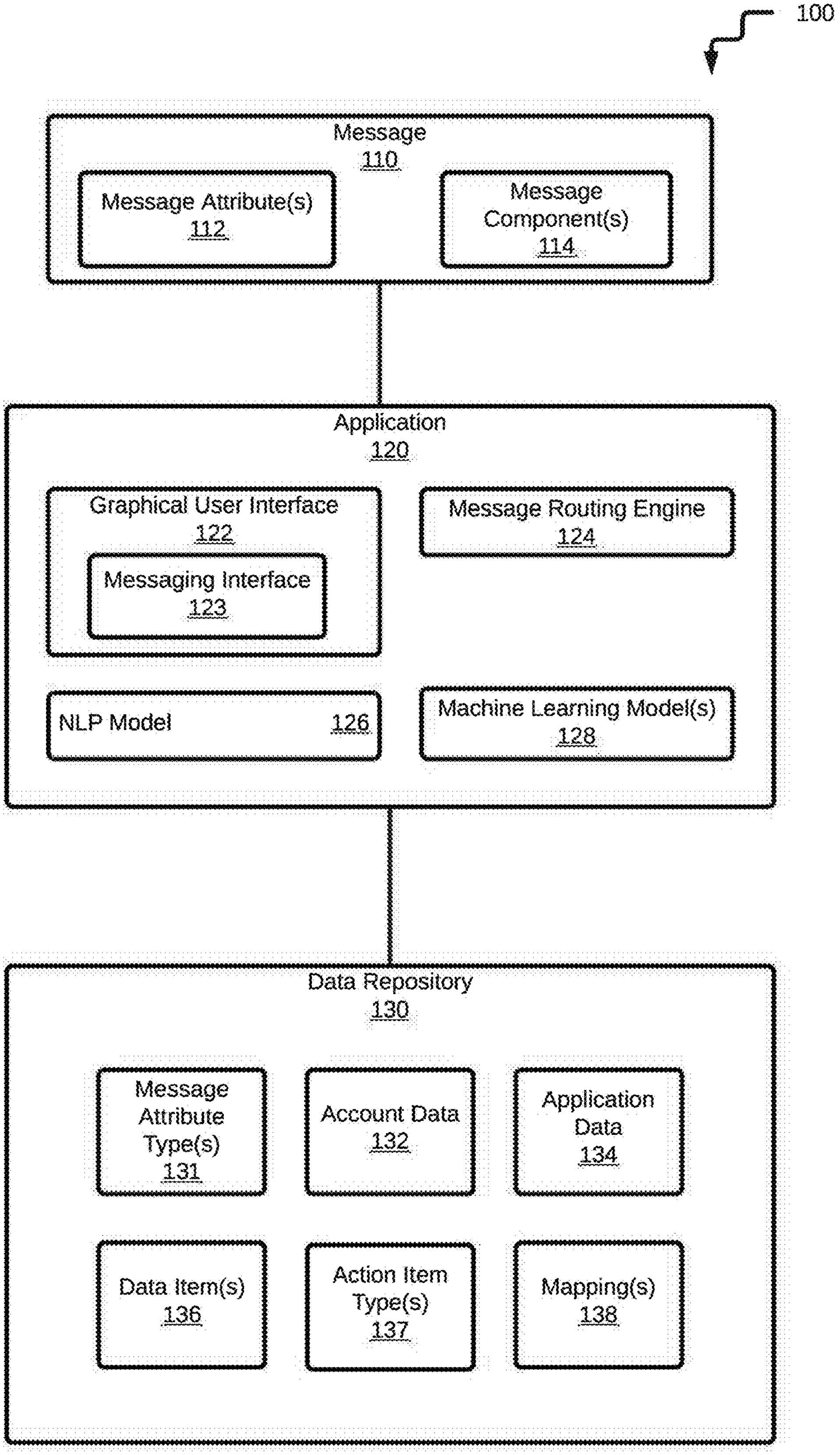
FIG. 1 illustrates a system in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present disclosure.

1. GENERAL OVERVIEW
2. CONTENT ROUTING ARCHITECTURE
3. CONTENT-BASED MESSAGE COMPONENT ROUTING
4. EXAMPLE EMBODIMENTS
5. MACHINE LEARNING
6. PRACTICAL APPLICATIONS, ADVANTAGES, AND IMPROVEMENTS
7. COMPUTER NETWORKS AND CLOUD NETWORKS
8. HARDWARE OVERVIEW
9. MISCELLANEOUS; EXTENSIONS

1. GENERAL OVERVIEW

One or more embodiments analyze messages to determine components within a message and select recipients for the individual message components of the message based on the respective contents of the message components. The system detects a message and computes a plurality of message components comprised in the message. The system processes the respective message components to determine respective sets of message attributes for the respective message components. The system applies a machine learning model to a set of message attributes to select a recipient for the associated message component. The system transmits the different message components to respective recipients selected for the individual message components based on the application of the machine learning model.

In an example, the system receives a text message from a patient of a medical practice via a messaging portal. The message addresses a first doctor at the practice and includes multiple components that the patient would like to bring to the doctor's attention, for example, a request to refill prescriptions, a report of a new concern, and a question about a bill. The system identifies three message components: the refill request, the symptom report, and the bill issue. The system can select the doctor to receive the refill request, a nurse on the doctor's staff to receive the symptom report, and a billing office employee to receive the bill issue. The system may also identify that one or more of the patient's prescriptions were written by a different doctor at the practice and select that doctor to receive the refill request instead of the first doctor.

One or more embodiments identify a set of components from a message based on the content of the components. The system may identify the set of components such that none of the components have overlapping portions with other components. The system may identify the set of components such that at least two identified components both include at least a particular portion of the message. The system may pre-select a candidate set of recipients for the components of the message. The system associates each candidate recipient with a corresponding content type or content attribute. A portion of the message that matches the content type or content attribute, corresponding to a particular candidate recipient, is extracted as a message component and transmitted to the particular candidate recipient. If the system determines that a message component is not relevant to any candidate recipient, the message component may be discarded without transmission to any candidate recipient.

One or more embodiments described in this Specification and/or recited in the claims may not be included in this General Overview section.

2. CONTENT ROUTING ARCHITECTURE

FIG. 1 illustrates a system 100 in accordance with one or more embodiments. As illustrated in FIG. 1, system 100 includes an application 120 and a data repository 130. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, the application 120 refers to hardware and/or software configured to perform operations described herein for routing components of received messages according to the message content. The application 120 may be a business management application, such as a medical practice application, or a customer- or client-management application. The application 120 may include one or more functional components, such as a graphical user interface (GUI) 122, a message routing engine 124, a natural language processing (NLP) model 126, and a machine learning model 128. Examples of operations for content-based message routing are described below with reference to FIG. 2.

The application 120 may be configured to receive a message 110 from a user of the application or from an external user, such as a client or a patient. The message 110 may be in a human-readable format, for example, text entered from a keyboard, or from a speech-to-text conversion operation. The message may be an email message, a text message, or a chat message.

The message may be machine-generated or from a human user. The message 110 may have one or more message attributes 112 of one or more message attribute types 131. Message attribute types 131 may include, for example, a keyword, a timestamp, a sender identity, a message endpoint, and/or a recipient identity. A keyword may include a word or word phrase. Keywords may be mapped to message components. A timestamp may identify a date and time when the message was sent, received, read, and/or stored. A message endpoint may be an address or other location information that receives the message, such as an email address, a cell phone number, or a network address. A sender identity may include a name, an address, and/or a unique identifier for an individual or entity that sent the message. A recipient identity may include a name, an address, and/or a unique identifier for an individual or entity to whom the message is directed.

The message 110 may have one or more message components 114. A message component 114 may include a word or a group of non-contiguous words, one or more word phrases, and/or one or more sentences. A message component 114 represents a single issue, topic, action, or concept that the message sender desires to bring to the attention of the recipient entity. For example, a message that states "Hi Doctor, I'm almost out of 2 of my meds, can you refill them please? And I don't understand the bill I just got, I thought I'd met my deductible? Oh, I'm going out of town so can I get a 90 day supply of the meds instead of 30 days?" may include two message components, one about getting two prescriptions refilled, and one about a billing question. Accordingly, one message component is "Hi Doctor, I'm almost out of 2 of my meds, can you refill them please? I'm going out of town so can I get a 90 day supply of the meds instead of 30 days" and the other message component is "I don't understand the bill I just got, I thought I'd met my deductible". In some embodiments, a message component may include content words without including articles, pronouns, conjunctions and other words that do not contribute to the meaning of the message component.

The application 120 may generate and display a variety of GUI components with GUI 122 to allow users to interact with the functions and information of the application. The GUI 122 refers to hardware and/or software configured to facilitate communications between a user and the application 120. GUI 122 renders user interface elements and receives input via user interface elements. Examples of user interface elements include checkboxes, radio buttons, dropdown lists, list boxes, buttons, toggles, text fields, date and time selectors, command lines, sliders, pages, and forms.

In an embodiment, different components of GUI 122 are specified in different languages. The behavior of user interface elements is specified in a dynamic programming language such as JavaScript. The content of user interface elements is specified in a markup language, such as hypertext markup language (HTML) or XML User Interface Language (XUL). The layout of user interface elements is specified in a style sheet language such as Cascading Style Sheets (CSS). Alternatively, GUI 122 is specified in one or more other languages, such as Java, C, or C++. GUI 122 displays the message 110 in a messaging interface 123. The messaging interface 123 may include, for example, a message display component and a message composition field.

The message routing engine 124 can partition a message into a plurality of message components 114 and identify the message attributes of the message components, for example, by using the NLP model 126 to identify keywords, other words, and word phrases in the message. The message routing engine 124 may also determine timestamp information as well as sender information, addressed recipient information, and other message attributes.

The message routing engine 124 may be configured to access application information based on the message attributes of a message component and/or based on data items associated with a message component to select a recipient for a message component. The message routing engine 124 selects a recipient, for example, using a machine learning model 128. An example of a machine learning model and process is described below with reference to FIG. 4.

Application information can include account data 132. Account data 132 may include information identifying and describing clients served by the application. The information can include contact information, account numbers, data records about the user or client, and so forth. For a medical practice application, the account data can include patient records that include current and past medical conditions, medications, test results, and so forth. For a commercial business practice application, the account data can include client accounts, billing and invoice records, work product generated for a client, contracts, and so forth.

Application information can include application data 134. Application data 134 can include information used by the application 120 as part of the functions the application performs. For example, the application data 134 can include calendar and scheduling information, personnel accounts, and application-specific reference information. For a medical practice application, the application data 134 can include information about medications, conditions addressed by the medications, available dosages for the medications, contraindications for the medications, and so forth. The application data 134 could include, for the users of the application, employee records, specialties, certifications, hospital privileges, and so forth.

The message routing engine 124 may access and use data item(s) 136 to select a recipient for a message component. A data item 136 may include a data record or other piece of information used by the application 120 and associated with a specific entity, such as a customer or an employee. For a medical management application, data items could include an appointment associated with a patient and a staff member, a patient's active prescriptions, a test result, a medical history, and a health insurance account. For a legal practice management application, data items could include legal documents prepared for a client, a client billing account, client correspondence, and vendor accounts for support services. A data item 136 may be associated with one or more entities within the organization, for example, with the person who created the data item, a supervisor of the person who created the data item, or an account manager. Additionally, or alternatively, a data item may be associated with a client or customer.

In an embodiment, when a data item is associated with a message component, the GUI 122 may present an interface element corresponding to the data item in the messaging interface. For example, the GUI can display an interface element showing some details of a calendar entry for an appointment between the sender and the selected recipient. The interface element may be interactive, for example, allowing the recipient to navigate to the calendar entry in a scheduling application when the interface element is selected.

In an embodiment, a message component 114 may be mapped to or associated with an action item type 137. An action item type is a category of action that can be taken by a recipient to respond to an issue in a message component. An action type may be associated with a role, a position, or a specific staff member in an organization. Action item types can include, for example, the following: schedule a meeting; write a report; transmit a document; send an invoice; answer a medical question; and provide a status report.

The message routing engine 124 can create and use mapping(s) 138 when selecting a recipient for a message component. A mapping 138 can be an association between a message attribute and a message component; a message component and an action item type; an action item type and a candidate recipient; a data item and a message sender; and a data item and a recipient. In an embodiment, a machine learning model 128 may use the mappings 138 as training inputs.

In one or more embodiments, a data repository 130 is any type of storage unit and/or device (e.g., a file system, database, collection of tables, or any other storage mechanism) for storing data. Furthermore, a data repository 130 may include multiple different storage units and/or devices. The multiple different storage units and/or devices may or may not be of the same type or located at the same physical site. Furthermore, a data repository 130 may be implemented or executed on the same computing system as application 120. Additionally, or alternatively, a data repository 130 may be implemented or executed on a computing system separate from application 120. The data repository 130 may be communicatively coupled to application 120 via a direct connection or via a network.

Additional embodiments and/or examples relating to computer networks are described below in Section 7 titled "Computer Networks and Cloud Networks."

Information describing message attribute type(s) 131, account data 132, application data 134, data item(s) 136, action item type(s) 137, and mapping(s) 138 may be implemented across any of components within the system 100. However, this information is illustrated within the data repository 130 for purposes of clarity and explanation.

3. CONTENT-BASED MESSAGE COMPONENT ROUTING

Figure 2:
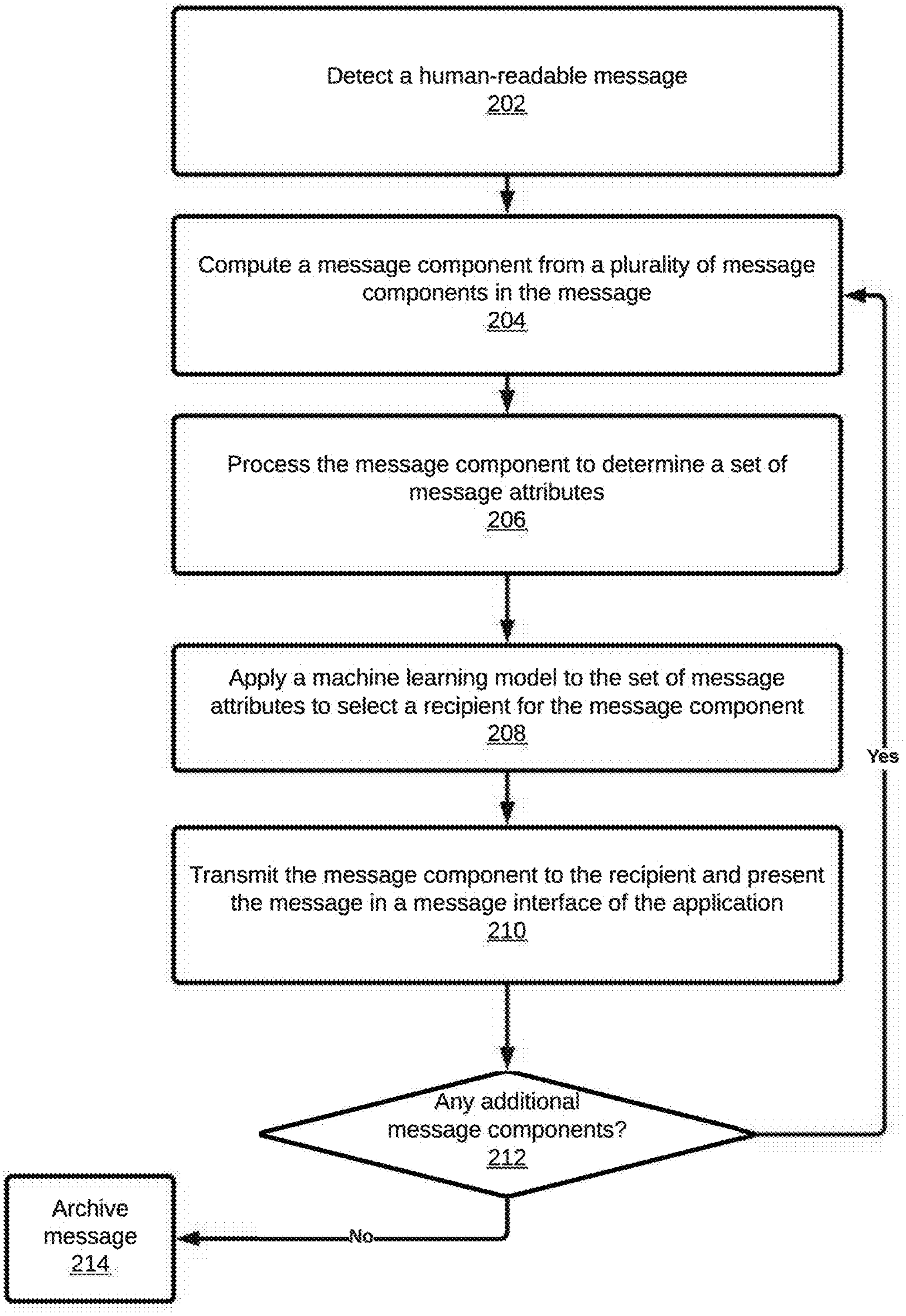
FIG. 2 illustrates an example set of operations for content-based message routing in accordance with one or more embodiments.

FIG. 2 illustrates an example set of operations for content-based message component routing in accordance with one or more embodiments. One or more operations illustrated in FIG. 2 may be modified, rearranged, or omitted. Accordingly, the particular sequence of operations illustrated in FIG. 2 should not be construed as limiting the scope of one or more embodiments.

In an embodiment, the system detects a human-readable message (Operation 202). The message may be part of a human-to-human communication that includes full or partial sentences, abbreviations, and colloquialisms that may or may not conform to grammatical and spelling rules of the language. The system detects the message, for example, at a messaging inbox or when a user enters text into a message composition field of the messaging interface, for example, from a keyboard, a speech-to-text conversion operation, or a drag-and-drop operation using text selected from elsewhere. The message may be received as an email message, a text message, e.g., an SMS message, or as a chat message.

The message may include information identifying an intended recipient, such as an email address, a telephone number, a username, or a chat handle.

In an embodiment, the system computes a message component from a plurality of message components in the message (Operation 204). The system may identify a set of components from a message based on the content of the components. The system can use one or more NLP models trained to identify words, phrases, patterns of words, and other language features that collectively indicate a particular message component. Additionally, or alternatively, the system may use a clustering algorithm to partition the message into message components, where a message component corresponds to a cluster of words, phrases, and/or sentences in the message that are more related or similar to each other than to other words, phrases, or sentences in the message. In an embodiment, the system may identify the plurality of message components at the same time and may store the message components temporarily until a recipient is identified for the message component.

In an embodiment, the system may identify the set of components such that none of the components have overlapping portions with other components. The system may identify the set of components such that at least two identified components both include at least a particular portion of the message.

In an embodiment, the system processes the message component to determine a set of message attributes (Operation 206). The system may parse the message to identify keywords, for example, with an NLP model. The system may also identify one or more message attributes from metadata or other data associated with the message, such as the sender of the message, an addressed recipient, a timestamp for when the message was sent, and a timestamp for when the message was received and/or viewed. The system may also determine an action item type for the message component and may add the action item type as a message attribute for the message component.

In an embodiment, the system applies one or more machine learning models to the set of message attributes to select a recipient for the message component (Operation 208). A machine learning model may use the message attributes, e.g., keywords, sender information, action item type, and/or message endpoint, as inputs. The machine learning model selects a recipient for the message component according to the inputs. For example, the machine learning model may take message attributes that include keywords “refill”, “medication”, and sender information to select a doctor associated with the sender as a recipient. The machine learning model may also act on additional inputs from the system, such as information from data items associated with the sender and/or an addressed recipient.

In an embodiment, the system may pre-select a candidate set of recipients for the components of the message. For example, the system may pre-select the candidate set of recipients based on any named recipients in the message, or a group of recipients associated with a named recipient (e.g., support staff for the named recipient). The system associates each candidate recipient with a corresponding content type or content attribute. A portion of the message that matches the content type or content attribute, corresponding to a particular candidate recipient, is extracted as a message component and transmitted to the particular candidate recipient. If the system determines that a message component is not relevant to any candidate recipient, the message component may be discarded without transmission to any candidate recipient.

In an embodiment, system may evaluate if a named recipient is the correct recipient for a message component. For example, if a message component is a request to renew a prescription directed to a first doctor, the system may look up the prescription(s) data items for the sender, identify the prescribing doctor(s), and determine if the first doctor is one of the prescribing doctors. If the first doctor is not a prescribing doctor, the system may select the prescribing doctor of a prescription as the recipient for the message component. In another example, the message component may be a request for a legal opinion on a matter sent to a paralegal. The system may determine that the message component is for an action item type that is associated with an attorney role, identify an attorney who has an established relationship with the sender, and select the attorney as the recipient of the message component.

In an embodiment, the system transmits the message component to the selected recipient and presents the message component in a messaging interface of the application (Operation 210). The system may compose a new message that includes the message component without other parts of the original message. The system may compose a new message that contains the entirety of the original message but re-ordered, so the currently considered message component is at the beginning of the message. The currently considered message component may be emphasized, e.g., in a bold font, and/or the other message components may be de-emphasized, e.g., in a smaller font or a paler font color.

The system may identify a data item associated with the sender and/or the selected recipient of a message component and may present an interface element representing the data item in the messaging interface along with the message component. For example, if the sender and the selected recipient have an upcoming meeting or appointment together, the system may present an interface element that shows information about the upcoming meeting. In another example, for a medication refill request, the system may identify data items of the sender’s prescriptions and present interface elements showing information about the prescriptions.

In an embodiment, the recipient may request that the system forward the message component to a second, different, recipient, for example, if the recipient is out of the office or otherwise unable to attend to the message component. The system forwards and presents the message component to the second recipient. The system may identify another data item associated with the sender and/or the second recipient of a message component and may present an interface element representing the data item in the messaging interface along with the message component. The system does not present interface elements for other data items associated with the first recipient that are not associated with the second recipient.

In an embodiment, the system determines if there are any additional message components to route to a recipient (Operation 212). When there are additional message components to route to a recipient, the system returns to Operation 204. If the message components were previously computed at the same time, the system may return to Operation 206 after selecting another message component to process.

In an embodiment, when there are no remaining message components to route to a recipient, the system archives the message (Operation 214). The system may store the original message and may store additional information, e.g., as metadata, indicating the message components and the recipients selected for the message components. The archived messages may be used as training data when updating a machine learning model.

4. EXAMPLE EMBODIMENTS

Several detailed examples are described below for purposes of clarity. Components and/or operations described below should be understood as one specific example that may not be applicable to certain embodiments. Accordingly, components and/or operations described below should not be construed as limiting the scope of any of the claims.

Figure 3:
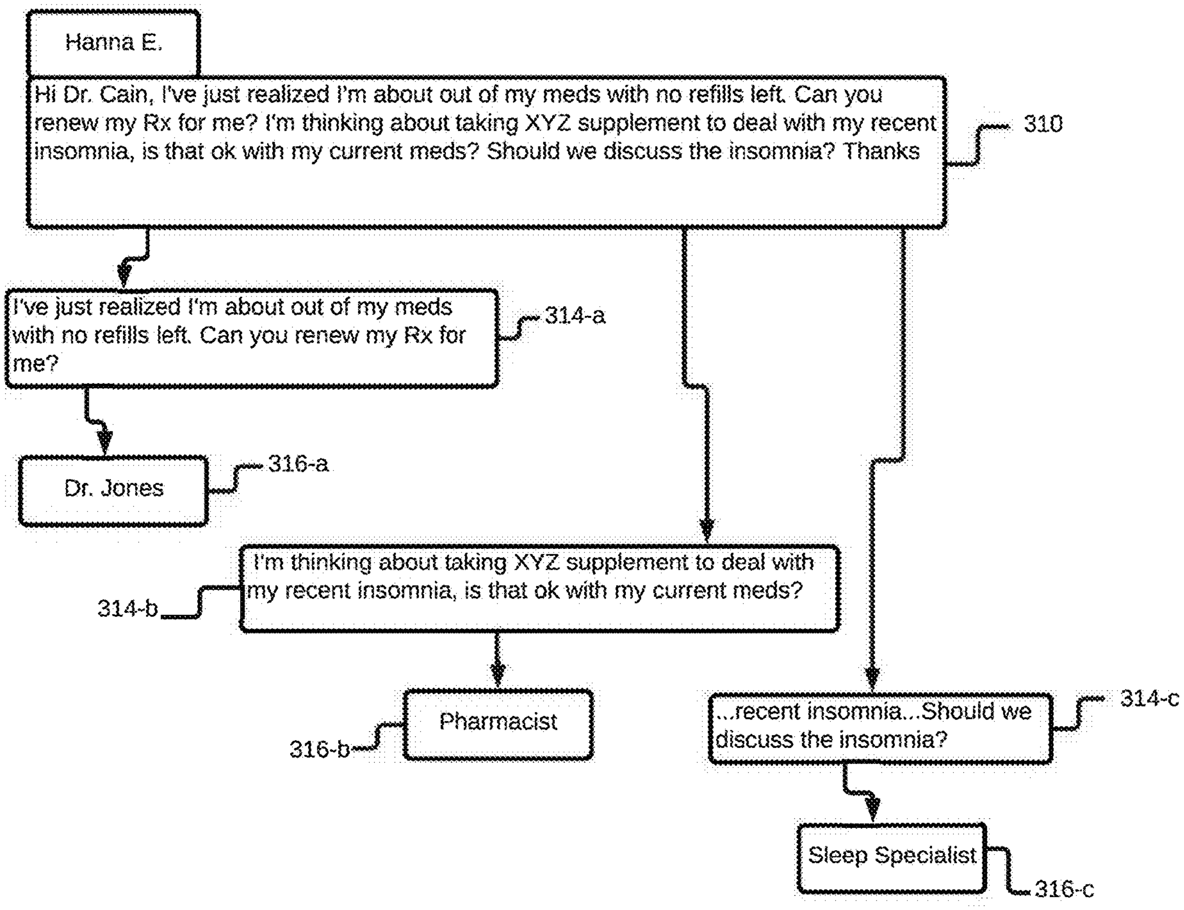
FIG. 3 illustrates an example of a message and message components in accordance with one or more embodiments.

FIG. 3 illustrates an example of a message 310 and how the message may be partitioned into message components that are sent to different recipients. The system receives the message and processes the text to identify message components. In the illustrated example, the system has identified three message components: 314-*a*, 314-*b*, and 314-*c*. For message component 314-*a*, the system has processed the message and identified the words "meds", "refill", "renew", and "Rx" as being related. For message component 314-*b*, the system has identified the words "taking XYZ supplement", "ok", and "current meds" as related. For message component 314-*c*, the system has identified the words "recent insomnia" and "should we discuss" as related.

The system identifies the message attributes of the message components. The system may initially identify message attributes of the whole message, such as the sender's identity, "Hanna E.", in the example, and an addressed recipient, "Dr. Cain", in the example. For message component 314-*a*, the system further identifies message attributes related to a prescription refill action item type. For message component 314-*b*, the system further identifies message attributes related to a question about medication interactions between the sender's prescriptions and XYZ supplement. For message component 314-*c*, the system further identifies message attributes related to a new symptom: insomnia.

The system selects a recipient for the respective message components. For message component 314-*a*, the system accesses prescription data items for the sender and identifies that the prescribing doctor is Dr. Jones, not Dr. Cain. The system accordingly selects Dr. Jones as the recipient 316-*a* for the message component 314-*a*. For message component 314-*b*, the system identifies that a question about medication interactions should be answered by a pharmacist and selects a pharmacist at the recipient 316-*b* for the message component 314-*b*.

For message component 314-*c*, the system further identifies message attributes related to a new symptom: insomnia. The system accesses application information to determine a medical specialty associated with treating insomnia. The system determines that Dr. Cain's practice area or specialty is not one associated with treating insomnia, so the system selects a sleep specialist as the recipient 316-*c* for the message component 314-*c*.

Figure 4:
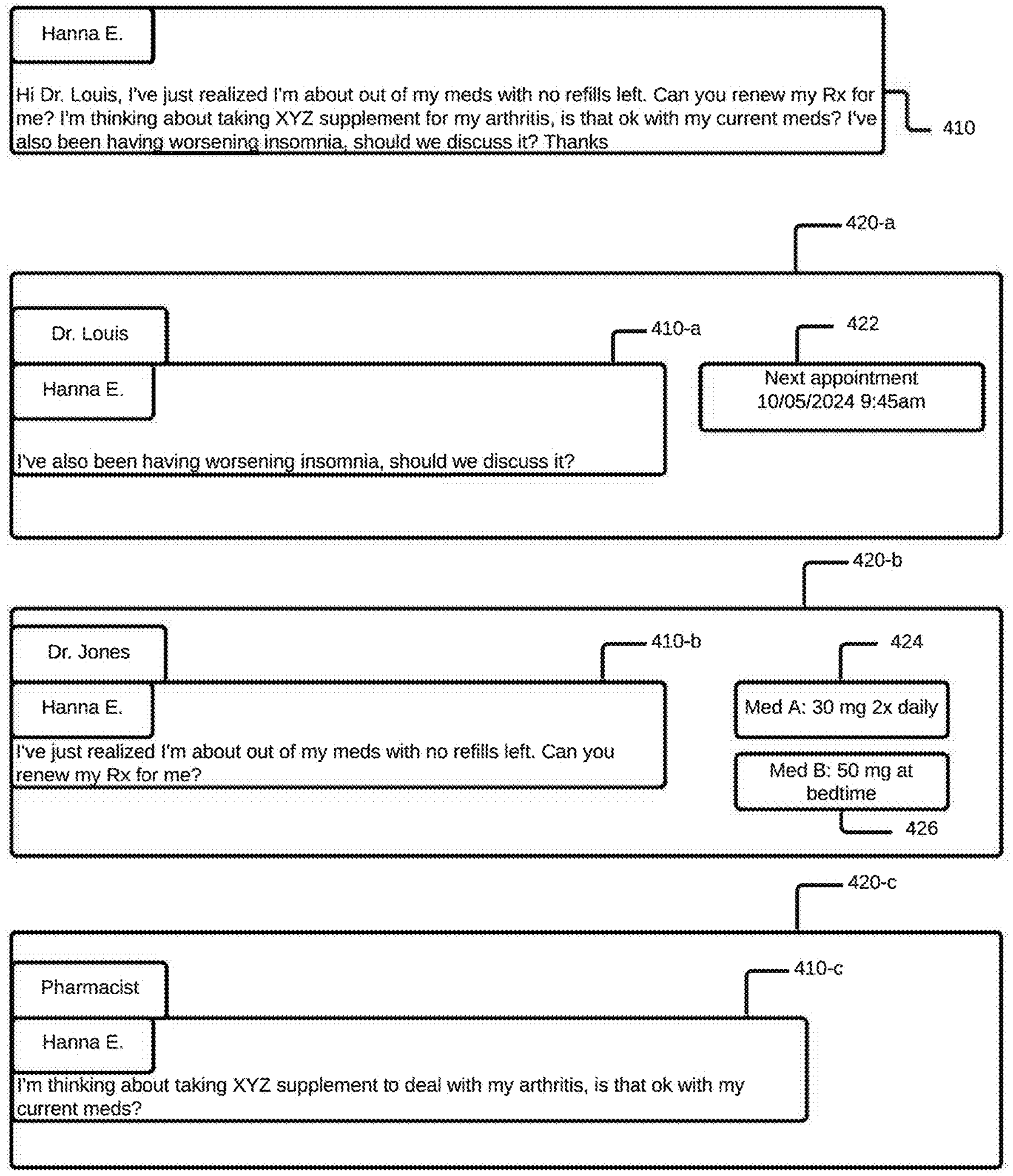
FIG. 4 illustrates an example of a message interface where the system composes a new message that includes a message component without other parts of the original message.

FIG. 4 illustrates an example of a message interface where the system composes a new message that includes a message component without other parts of the original message. The system has received a message 410 from a sender. The system partitions the message into three different message components. Although the message 410 is directed to Dr. Louis, the system determines three different recipients for the respective message components: Dr. Louis, Dr. Jones, and a pharmacist.

Dr. Louis views message interface 420-*a*. The message interface 420-*a* may represent a message inbox or chat interface associated with Dr. Louis. The system has composed a new message 410-*a* from message 410 that includes the message component identified for Dr. Louis. The system displays the new message 410-*a* in the message interface 420-*a* without the other message components form message 410. Additionally, the system has identified a data item associated with the sender and Dr. Louis, in this case, an existing appointment. The system presents an interface element 422 representing the data item in the messaging interface along with the message component.

Dr. Jones views message interface 420-*b*. The system has composed a new message 410-*b* that includes the message component identified for Dr. Jones. The system displays the new message 410-*b* in the message interface 420-*b* without the other message components. Additionally, the system has identified a data item associated with the sender and Dr. Jones, in this case, the medications prescribed to the sender by Dr. Jones. The system presents interface elements 424 and 426 representing the data items in the messaging interface along with the message component.

A pharmacist views message interface 420-*c*. The system has composed a new message 410-*c* that includes the message component identified for the pharmacist. The system displays the new message 410-*c* in the message interface 420-*c* without the other message components.

Figure 5:
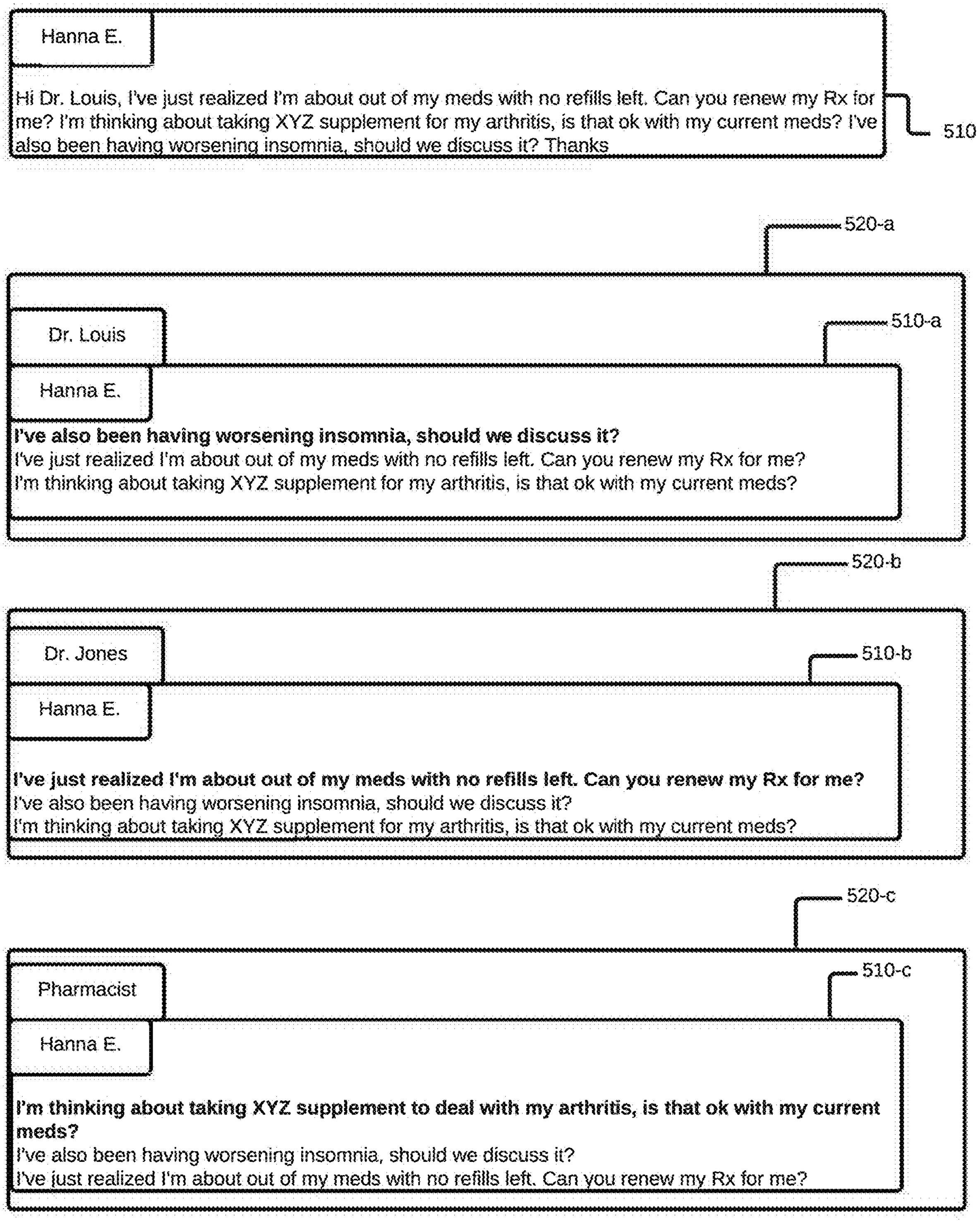
FIG. 5 illustrates an example of a message interface where the system composes a new message that contains the entirety of the original message but re-ordered according to the recipient.

FIG. 5 illustrates an example of a message interface where the system composes a new message that contains the entirety of the original message but re-ordered according to the recipient. The system has received a message 510 from a sender. The system partitions the message into three different message components. Although the message 510 is directed to Dr. Louis, the system determines three different recipients for the respective message components: Dr. Louis, Dr. Jones, and a pharmacist.

Dr. Louis views message interface 520-*a*. The message interface 520-*a* may represent a message inbox or chat interface associated with Dr. Louis. The system has composed a new message 510-*a* from message 510 that rearranges the message components from message 510 so that the message component identified for Dr. Louis appears first. The system displays the new message 510-*a* in the message interface 520-*a*. The system also visually emphasizes the message component for the recipient, e.g., in a bold font as shown.

Dr. Jones views message interface 520-*b*. The system has composed a new message 510-*b* from message 510 that rearranges the message components from message 510 so that the message component identified for Dr. Jones appears first. The system displays the new message 510-*b* in the message interface 520-*b*.

The pharmacist views message interface 520-*c*. The system has composed a new message 510-*c* from message 510 that rearranges the message components from message 510 so that the message component identified for the pharmacist appears first. The system displays the new message 510-*c* in the message interface 520-*c*.

Figure 6:
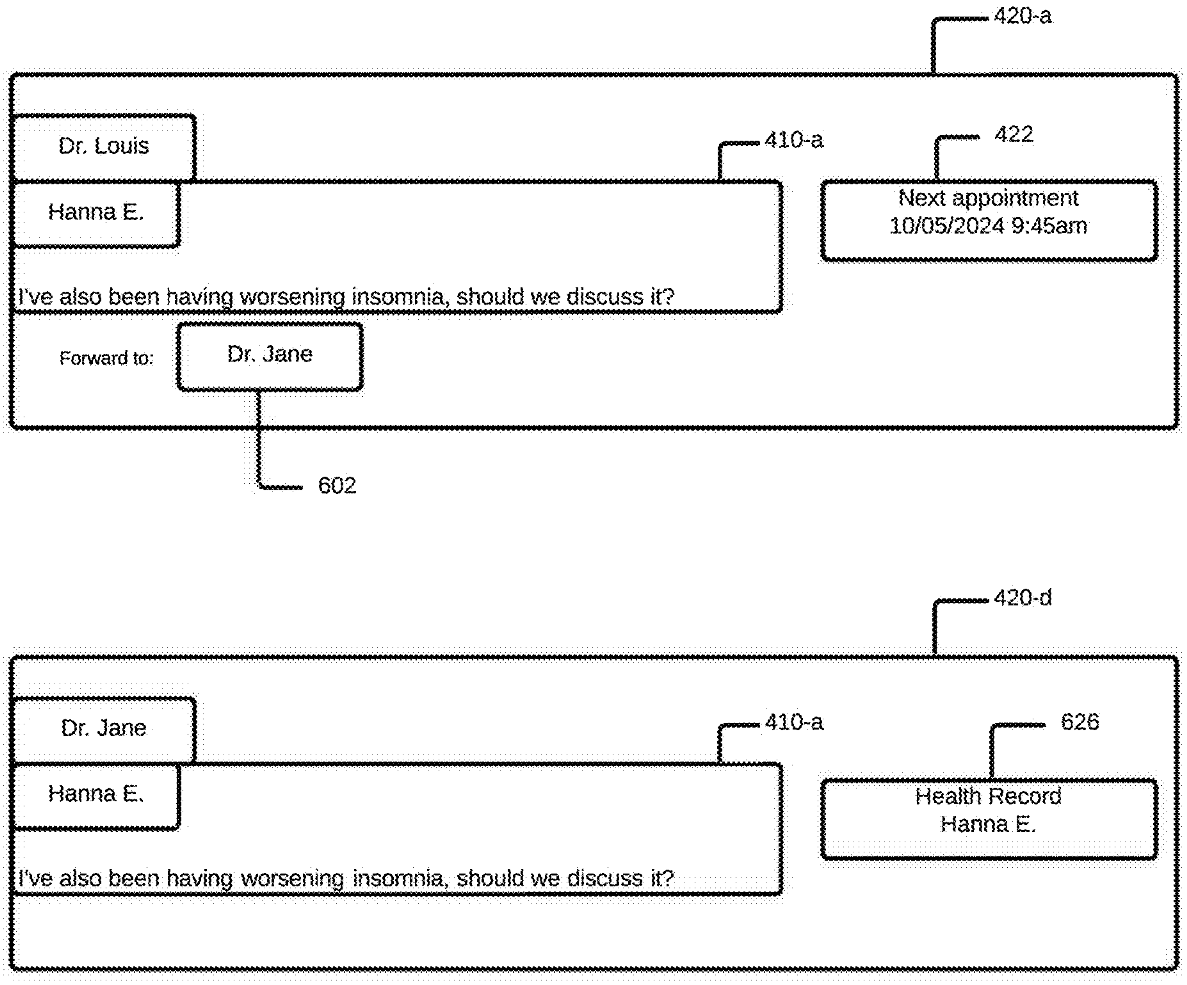
FIG. 6 illustrates an example of a message interface where the recipient requests that the system forward the message component to a second, different, recipient.

FIG. 6 illustrates an example of a message interface where a recipient requests that the system forward the message component to a second, different, recipient. Using message interface 420-*a*, viewed by Dr. Louis, Dr. Louis requests that the message 410-*a* be forwarded to Dr. Jane, using forwarding element 602. The message interface 420-*a* displays an interface element 422 representing a data item associated with the sender and Dr. Louis, i.e., an appointment.

Dr. Jane views the message 410-*a* in message interface 420-*d*. Because the appointment data item is not associated with Dr. Jane, the system does not display interface element 422. Instead, the system may identify another data item associated with the sender and/or the second recipient of a message component, e.g., a health record for the sender, and may present the interface element 625 in the messaging interface along with the message component.

5. MACHINE LEARNING

Figure 7:
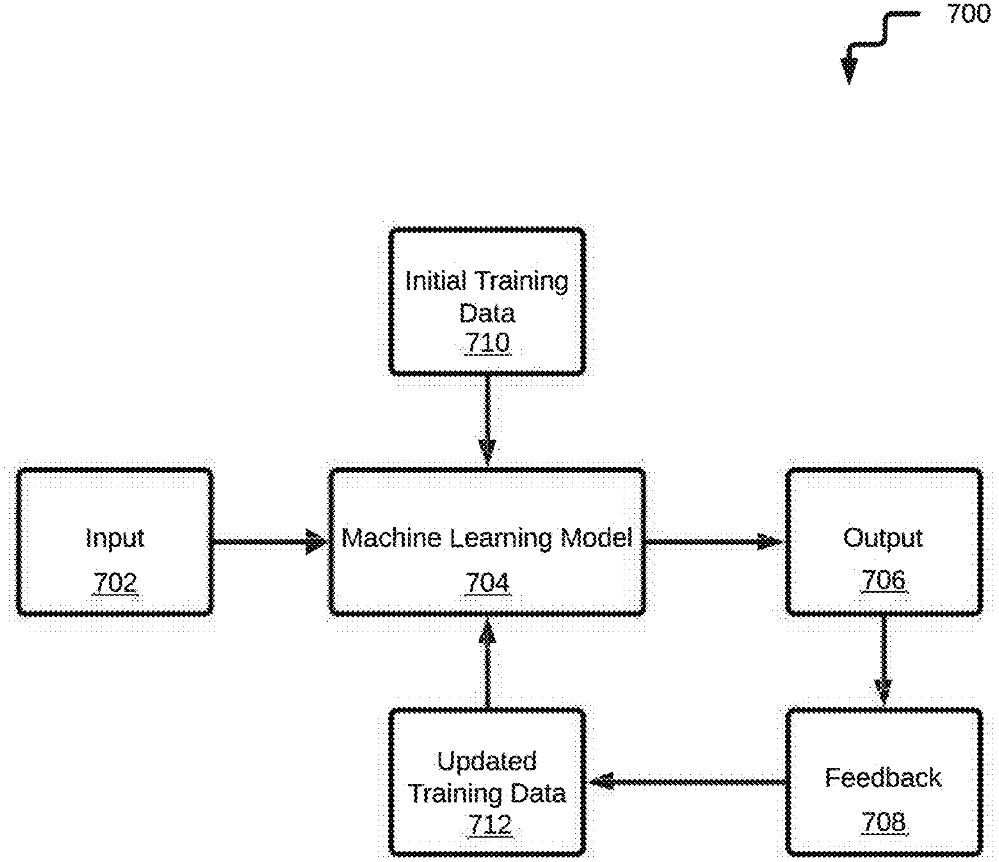
FIG. 7 illustrates an example of a machine learning process in accordance with one or more embodiments.

FIG. 7 illustrates a machine learning process 700 according to one or more embodiments. A machine learning model 704 may be iteratively trained on initial training data 710 to map a set of input variables to an output variable. The initial training data 710 for a machine learning model trained to select a recipient for a message component may include message attributes and recipients mapped to the one or more message attributes.

Once trained initially, the machine learning model 704 may act on an input 702. A machine learning model trained to select a recipient for a message component may act on input that includes message attributes to produce output 706 in the form of one or more recipients for a message component.

The training data may be updated based on, for example, feedback 708 on the accuracy of the current machine learning model 704. For example, if a selected recipient subsequently forwards a message component to another recipient, the system may update a mapping in the training data between the message attributes associated with the message component and the recipient. Updated training data 712 is fed back into the machine learning algorithm that, in turn, updates the machine learning model 704.

A machine learning model 704 is trained so that the model best fits the datasets of training data to the labels or outputs of the training data. Additionally, or alternatively, machine learning model 704 is trained so that when the model is applied to the datasets of the training data, a maximum number of results determined by the model matches the labels or outputs of the training data. Different target models may be generated based on different machine learning algorithms and/or different sets of training data.

A machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering.

6. PRACTICAL APPLICATIONS, ADVANTAGES, AND IMPROVEMENTS

Conventionally, messages directed to an organization, such as a business or government agency, from external entities may be addressed to one individual or message endpoint but may include multiple issues that need attention from different agents. In some cases, the message sender may not direct the message to any specific individual. Even when a message is directed to one specific message endpoint or individual, the entity or entities at the specific message endpoint may not be able to act on the issue(s) in the message. These issues may cause delays in responding to the issues in the message as the staff routes or re-routes the message to the appropriate individuals in the organization. When a message contains multiple issues and is manually re-routed to multiple individuals, the respective individuals may not know the issues that have been addressed and may duplicate efforts made to resolve the issue.

One or more embodiments partition a message into message components and identify a recipient for an individual component even if the message is addressed to a different recipient or not addressed to any recipient in particular. The system accordingly delivers the message components to the individuals to whom the message component is relevant. Because a message component is delivered to a relevant endpoint, the message component is more likely to be acted on in a timely way. The sender is relieved of needing to know the specifics of where the message should be directed. Similarly, the staff within the organization is relieved of having to redirect a message received at a less relevant endpoint.

7. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
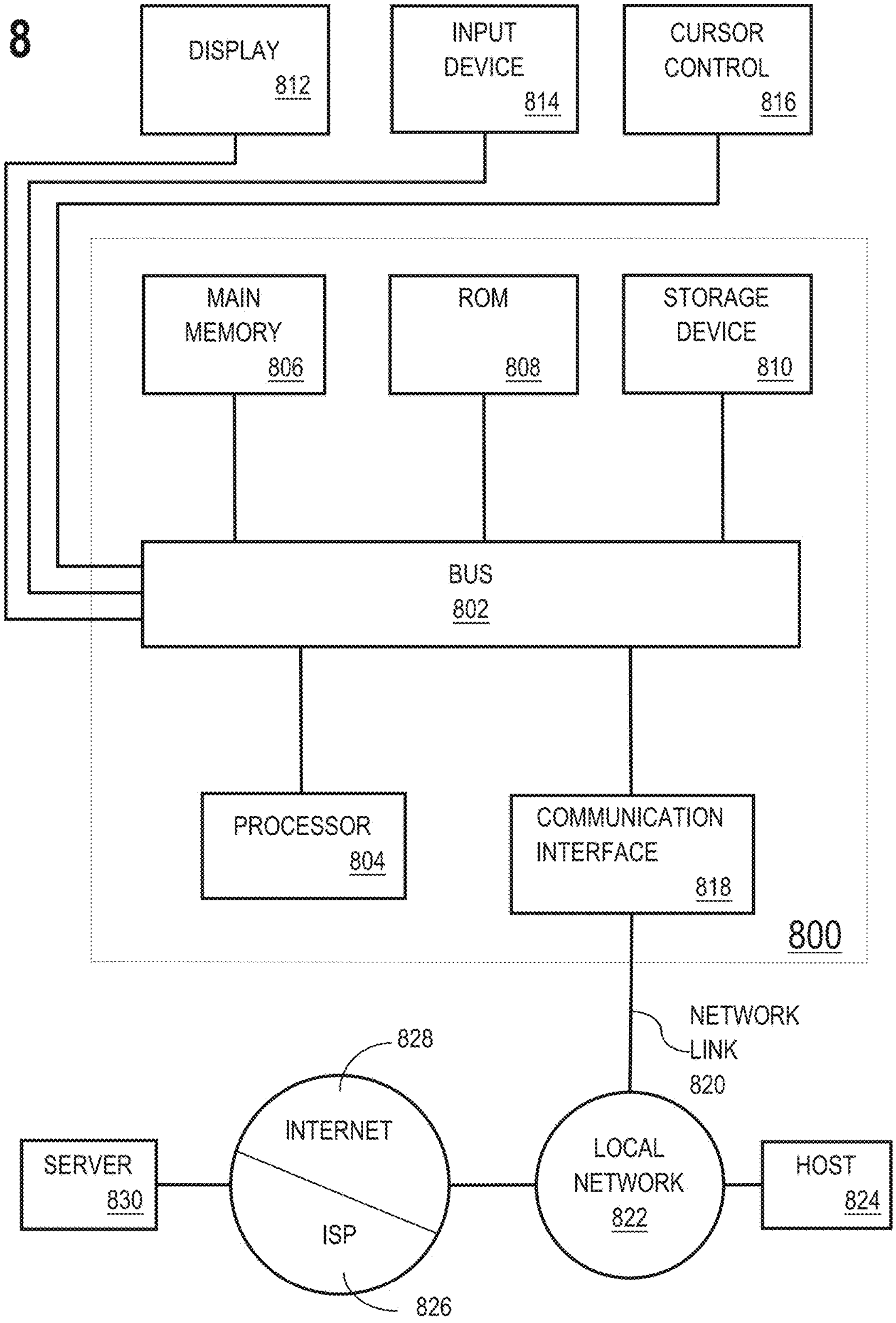
FIG. 8 shows a block diagram that illustrates a computer system in accordance with one or more embodiments.

For example, FIG. 8 is a block diagram that illustrates a computer system 800 that can be used to implement an embodiment of the disclosure. Computer system 800 includes a bus 802 or other communication mechanism for communicating information, and a hardware processor 804 coupled with bus 802 for processing information. Hardware processor 804 may be, for example, a general-purpose microprocessor.

Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or a Solid-State Drive (SSD) is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic that, in combination with the computer system, causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into the remote computer's dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806. Processor 804 retrieves and executes the instructions from main memory 806. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822.

For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic, or optical signals that carry digital data streams. Example forms of transmission media include the signals through the various networks, the signals on network link 820, and the signals that carry the digital data to and from computer system 800 through communication interface 818.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as the code is received, and/or stored in storage device 810, or other non-volatile storage for later execution.

9. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected and every effort made to prevent their use in any manner that might adversely affect their validity as trademarks.

Embodiments are directed to a system with one or more devices that include a hardware processor and that are configured to perform any of the operations described herein and/or recited in any of the claims below.

In an embodiment, one or more non-transitory computer readable storage media comprises instructions that, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form that such claims issue, including any subsequent correction.

What is claimed is:

1. One or more non-transitory computer readable media comprising instructions that, when executed by one or more hardware processors, cause performance of operations comprising:
- detecting, by an application at a receiving system, a message in a human-readable format;
- partitioning, by the application using a first Natural Language Processing (NLP) model or a clustering algorithm, the message into a plurality of message components comprising a first message component and a second message component;
- routing, by the application, the first message component at least by:
  - applying, by the application, a second NLP model to the first message component to determine a first set of message attributes corresponding to the first message component;
  - applying, by the application, a machine learning model to the first set of message attributes of the first message component to select a first recipient for the first message component;
  - transmitting, by the application, at least the first message component to the first recipient without transmitting the second message component to the first recipient; and
- routing, by the application, the second message component at least by:
  - applying, by the application, the second NLP model to the second message component to determine a second set of message attributes corresponding to the second message component;
  - applying, by the application, the machine learning model to the second set of message attributes of the second message component to select a second recipient for the second message component; and
  - transmitting, by the application, the second message component to the second recipient without transmitting the first message component to the second recipient.

2. The one or more non-transitory computer readable media of claim 1, wherein the first recipient is not a named recipient on the message.

3. The one or more non-transitory computer readable media of claim 1, wherein the operations further comprise:
- presenting the message to the first recipient in a message interface of a first instance of the application;
- identifying a first data item related to the message based on the first set of message attributes; and
- displaying a first interface element associated with the first data item in the message interface.

4. The one or more non-transitory computer readable media of claim 3, the operations further comprising:
- determining an association between a candidate recipient and the first data item; and
- selecting the candidate recipient as the first recipient.

5. The one or more non-transitory computer readable media of claim 3, wherein the operations further comprise:

receiving, by the first instance of the application, a request from the first recipient to forward the message to a different recipient;

identifying a second data item related to the message based on the first set of message attributes;

determining that the first data item is not relevant to the different recipient; and presenting, by a second instance of the application, a second interface element associated with the second data item without presenting the first interface element.

6. The one or more non-transitory computer readable media of claim 1, wherein the first set of message attributes comprise at least one of: a source of the message, a sender of the message, a keyword, a data record associated with the source of the message, a named recipient, or a time that the message was received.

7. The one or more non-transitory computer readable media of claim 1, wherein the operations further comprise:

receiving, by a first instance of the application, a request from the first recipient to forward a message component to a different recipient; and presenting, by a second instance of the application, the message component to the different recipient.

8. A method comprising:

detecting, by an application at a receiving system, a message in a human-readable format at an application;

partitioning, by the application using a first Natural Language Processing (NLP) model or a clustering algorithm, the message into a plurality of message components comprising a first message component and a second message component;

routing, by the application, the first message component at least by:

applying, by the application, a second NLP model to the first message component to determine a first set of message attributes corresponding to the first message component;

applying, by the application, a machine learning model to the first set of message attributes of the first message component to select a first recipient for the first message component;

transmitting, by the application, at least the first message component to the first recipient without transmitting the second message component to the first recipient; and routing, by the application, the second message component at least by:

applying, by the application, the second NLP model to the second message component to determine a second set of message attributes corresponding to the second message component;

applying, by the application, the machine learning model to the second set of message attributes of the second message component to select a second recipient for the second message component; and transmitting, by the application, the second message component to the second recipient without transmitting the first message component to the second recipient;

wherein the method is performed by at least one device including a hardware processor.

9. The method of claim 8, wherein the first recipient is not a named recipient on the message.

10. The method of claim 8, further comprising:

presenting the message to the first recipient in a message interface of a first instance of the application;

identifying a first data item related to the message based on the first set of message attributes; and displaying a first interface element associated with the first data item in the message interface.

11. The method of claim 10, further comprising:

determining an association between a candidate recipient and the first data item; and selecting the candidate recipient as the first recipient.

12. The method of claim 10, further comprising:

receiving, by the first instance of the application, a request from the first recipient to forward the message to a different recipient;

identifying a second data item related to the message based on the first set of message attributes;

determining that the first data item is not relevant to the different recipient; and presenting, by a second instance of the application, a second interface element associated with the second data item without presenting the first interface element.

13. The method of claim 8, further comprising:

receiving, by a first instance of the application, a request from the first recipient to forward a message component to a different recipient; and presenting the message component, by a second instance of the application, to the different recipient.

14. The method of claim 8, further comprising:

training the machine learning model to select a recipient for a message component based on message attributes based on training data sets, wherein the training data sets include a first training data set comprising:

a first set of one or more message attributes; and a first recipient mapped to the first set of one or more message attributes;

wherein selecting the recipient based on a particular set of message attributes of a message component comprises applying the machine learning model to the particular set of message attributes to select the recipient.

15. A system comprising:

one or more hardware processors;

one or more non-transitory computer-readable media; and program instructions stored on the one or more non-transitory computer-readable media that, when executed by the one or more hardware processors, cause the system to perform operations comprising:

detecting, by an application at a receiving system, a message in a human-readable format;

partitioning, by the application using a first Natural Language Processing (NLP) model or a clustering algorithm, the message into a plurality of message components comprising a first message component and a second message component;

routing, by the application, the first message component at least by:

applying, by the application, a second NLP model to the first message component to determine a first set of message attributes corresponding to the first message component;

applying, by the application, a machine learning model to the first set of message attributes of the first message component to select a first recipient for the first message component;

transmitting, by the application, at least the first message component to the first recipient without transmitting the second message component, to the first recipient; and routing, by the application, the second message component at least by:

applying, by the application, the second NLP model to the second message component to determine a second set of message attributes corresponding to the second message component;

applying, by the application, the machine learning model to the second set of message attributes of the second message component to select a second recipient for the second message component; and transmitting, by the application, the second message component to the second recipient without transmitting the first message component to the second recipient.

* * * * *